(12) United States Patent
Grott

(10) Patent No.: US 8,091,653 B2
(45) Date of Patent: Jan. 10, 2012

(54) METHODS OF FORMULATING WEIGHTING AGENTS USING PROCESSED WASTE WATERS

(75) Inventor: Gerald J. Grott, Phoenix, AZ (US)

(73) Assignee: Ecycling, LLC, Phoenix, AZ (US)

( * ) Notice: Subject to any disclaimer, the term of this patent is extended or adjusted under 35 U.S.C. 154(b) by 0 days.

(21) Appl. No.: 12/286,221

(22) Filed: Sep. 29, 2008

(65) Prior Publication Data

US 2009/0065259 A1 Mar. 12, 2009

Related U.S. Application Data

(62) Division of application No. 11/643,477, filed on Dec. 21, 2006, now Pat. No. 7,717,173.

(51) Int. Cl.
C09K 8/02 (2006.01)
E21B 21/06 (2006.01)
(52) U.S. Cl. .......................................... 175/66; 175/65
(58) Field of Classification Search .................... None
See application file for complete search history.

(56) References Cited

U.S. PATENT DOCUMENTS

| | | |
|---|---|---|
| 1,899,310 A | 2/1933 | Burnham |
| 1,947,248 A | 2/1934 | Burks, Jr. |
| 2,375,019 A | 5/1945 | Miller |
| 2,387,898 A | 10/1945 | Grebe et al. |
| 2,552,775 A | 5/1951 | Fischer et al. |
| 2,624,654 A | 1/1953 | Hirsch |
| 2,671,714 A | 3/1954 | McIlhenny et al. |
| 2,687,358 A | 8/1954 | Allberry et al. |
| 2,897,051 A | 7/1959 | McIlhenny et al. |
| 2,919,898 A | 1/1960 | Marwil et al. |
| 2,927,010 A | 3/1960 | Le Baron |
| 2,968,572 A | 1/1961 | Peeler, Jr. |
| 3,022,824 A | 2/1962 | Binkley et al. |
| 3,071,481 A | 1/1963 | Beach et al. |
| 3,077,054 A | 2/1963 | Niemeijer |
| 3,174,623 A | 3/1965 | Sloan |
| 3,224,867 A | 12/1965 | Milloch |
| 3,329,595 A | 7/1967 | Barbato et al. |
| 3,331,207 A | 7/1967 | McGrew |
| 3,427,795 A | 2/1969 | Howard et al. |
| 3,456,368 A | 7/1969 | Jacques |
| 3,467,190 A | 9/1969 | Dunlap |
| 3,490,241 A | 1/1970 | Kuhn |
| 3,528,914 A * | 9/1970 | Darley .......................... 507/107 |
| 3,578,432 A | 5/1971 | Stiles |
| 3,617,554 A | 11/1971 | Thorborg |

(Continued)

FOREIGN PATENT DOCUMENTS

JP 4114988 A 4/1992

(Continued)

OTHER PUBLICATIONS

"Saline water" retrieved Feb. 24, 2011 from http://en.wikipedia.org/wiki/Saline_water.*

(Continued)

Primary Examiner — Angela M DiTrani
(74) Attorney, Agent, or Firm — Kenyon & Kenyon LLP

(57) ABSTRACT

In oil or gas well drilling, saline water is collected and separated into first and second streams of solid or liquid products containing salts. The first or second product is added to drilling fluids as a weighting agent.

7 Claims, 2 Drawing Sheets

U.S. PATENT DOCUMENTS

| | | | |
|---|---|---|---|
| 3,627,479 A | 12/1971 | Yee | |
| 3,754,953 A | 8/1973 | Martin | |
| 3,826,311 A | 7/1974 | Szabo et al. | |
| 3,928,654 A | 12/1975 | Bonnanzio | |
| 4,159,944 A | 7/1979 | Erickson et al. | |
| 4,160,738 A | 7/1979 | Guter | |
| 4,161,446 A | 7/1979 | Coillet | |
| 4,179,347 A | 12/1979 | Krause et al. | |
| 4,230,244 A | 10/1980 | Zissimopoulos | |
| 4,248,601 A | 2/1981 | McGough et al. | |
| 4,267,038 A | 5/1981 | Thompson | |
| 4,366,063 A | 12/1982 | O'Connor | |
| 4,422,940 A | 12/1983 | Cousino et al. | |
| 4,455,169 A | 6/1984 | Chatterji et al. | |
| 4,523,998 A | 6/1985 | Kim | |
| 4,525,202 A | 6/1985 | Large et al. | |
| 4,541,832 A | 9/1985 | Vitellaro et al. | |
| 4,592,931 A | 6/1986 | Cargle | |
| 4,828,726 A | 5/1989 | Himes et al. | |
| 4,857,202 A | 8/1989 | McNulty | |
| 4,996,065 A | 2/1991 | Van de Walle | |
| 5,039,439 A | 8/1991 | Hansman, Jr. et al. | |
| 5,121,708 A | 6/1992 | Nuttle | |
| 5,125,770 A | 6/1992 | Hesseling | |
| 5,147,532 A | 9/1992 | Leek, Jr. | |
| 5,192,426 A | 3/1993 | DeCoster et al. | |
| 5,240,579 A | 8/1993 | Kedem | |
| 5,300,123 A | 4/1994 | Grott | |
| 5,304,365 A | 4/1994 | Taborsky | |
| 5,337,516 A | 8/1994 | Hondulas | |
| 5,472,291 A | 12/1995 | Vogel | |
| 5,491,157 A | 2/1996 | Spadafora et al. | |
| 5,589,603 A * | 12/1996 | Alexander et al. | 588/250 |
| 5,670,038 A | 9/1997 | McKinney | |
| 5,712,224 A | 1/1998 | Boyd et al. | |
| 5,853,262 A | 12/1998 | Vogel | |
| 5,858,240 A | 1/1999 | Twardowski | |
| 5,972,689 A | 10/1999 | Cook et al. | |
| 6,063,737 A | 5/2000 | Haberman et al. | |
| 6,071,411 A | 6/2000 | Grott | |
| 6,156,226 A | 12/2000 | Klyosov et al. | |
| 6,308,457 B1 | 10/2001 | Howell | |
| 6,374,539 B1 | 4/2002 | Grott | |
| 6,379,546 B1 | 4/2002 | Braun | |
| 6,391,202 B1 | 5/2002 | Knobloch et al. | |
| 6,651,383 B2 | 11/2003 | Grott | |
| 6,666,971 B2 | 12/2003 | Chen | |
| 6,733,654 B1 | 5/2004 | Itzhak | |
| 6,878,286 B2 | 4/2005 | Jensen et al. | |
| 7,353,634 B2 | 4/2008 | Grott | |
| 7,455,109 B2 * | 11/2008 | Collins | 166/275 |
| 7,514,003 B2 | 4/2009 | Grott | |
| 7,622,044 B2 | 11/2009 | Grott | |
| 7,717,173 B2 | 5/2010 | Grott | |
| 7,771,600 B2 | 8/2010 | Grott | |
| 7,823,641 B2 | 11/2010 | Grott | |
| 7,866,916 B2 | 1/2011 | Grott | |
| 7,947,185 B2 | 5/2011 | Grott | |
| 2002/0104804 A1 | 8/2002 | Grott | |
| 2002/0108909 A1 | 8/2002 | Hughes | |
| 2002/0170816 A1 | 11/2002 | Leffler et al. | |
| 2003/0172697 A1 | 9/2003 | Sower | |
| 2004/0118042 A1 | 6/2004 | Grott | |
| 2008/0164218 A1 | 7/2008 | Grott | |
| 2009/0057240 A1 | 3/2009 | Grott | |

FOREIGN PATENT DOCUMENTS

| | | | |
|---|---|---|---|
| WO | 9806483 A1 | 2/1998 | |
| WO | 9823541 A1 | 6/1998 | |

OTHER PUBLICATIONS

Wynhausen, Ion Exchange Reg. for the Soft Water Service Industry, Reprinted from a series by Wynhausen, Pub in "Water Condition and Purification Mag". (unable to est. date).

J.R. Griffin, J.C. Silvertooth, E.R. Norton, Evaluation of Calcium Soil Conditioners in an Irrigated Cotton Production System, 1997, downloaded from web Mar. 31, 2000.

Edited by Robert A. Wright, The Reclamation of Disturbed Arid Lands, University of New Mexico, Alburquerque.Printed May 3, 2000.

Minerva Canto, Wetlands to be Protected, The West, Printed Sep. 27, 2001, L.A. Times, Los Angeles, CA.

Ken Ellingwood, EPA to Rule on Imperial County's Dusty Air Quality, The State, L.A. Times, Nov. 1, 2001, Los Angeles, CA.

G.J. Grott,"Do-It-Yourself" Liquid Clorine Bleach for Rural Sanitation, Presented at the 3rd NFS International Symposium on Small Drinking Water and Wastewater Systems, Apr. 2001.

Edited by Rob M. Geertman, Changing Waste Irrigation Waters from Pollutant to Beneficial Products, 8th World Salt Symposium, vol. 1, 2000.

H. Clark Metcalfe, Modern Chemistry, 1986, p. 347-351, 2nd Addition, Holt McDougal.

Glossary of Terms Used in Physical Organic Chemistry (IUPAC Recommendations 1994), downloaded from web Jan. 22, 2003.

Environmental Help Line, Downloaded from web on Apr. 8, 2003.

Salinity, downloaded from web on Apr. 8, 2003.

Terry Plane, Salinity Threat to Drinking Water, Jan. 22, 2003, Downloaded from web on Apr. 8, 2003.

Bettina Boxall, Salton Sea Plan Proposed, L.A. Times News Paper, May 12, 2003. Los Angeles, CA.

B.D. Seeling (Soil Scientist), Salinity & Sodicity in North Dakota Soils, May 2003.

Thomas E. Huggler, Cannon's Guide to Freshwater Fishing with Downriggers, Nov. 1986.

Terrence J. McMANUS P.E., Re-use of Agricultural Wastewaters from Power Plant Cooling One-year Pilot Plant Experience (XP-001030054). Jun. 24, 1979.

Mark Schonbeck, "Does My Soil Need Cation Nutrients Balancing?" A Practical Guide to Nutrition for Soil Crops, Downloaded from the web on Sep. 27, 2004.

Lisa Lieberman, Recycled Wastewater Used to Irrigate Crops in California, The Vegetable Growers News, 2003, Great American Publishing.

Bull et al., "Toxicological evaluation of risks associated with potable reuse of wastewater," 1981, Proceedings of the Water Reuse Symposium II: Washington. D.C., pp. 2176-2194.

Comprehensive Industry Document Series COINDS/24/1984-85, "Minimal National Standards Straight Nitrogenous Fertilizer Industry," Central Board for the Prevention and Control of Water Pollution, New Delhi, 60 pages.

Cooper, "Public health concerns in wastewater reuse," 1991, Water and Science Technology 24(9): 55-65.

Fleischman, Marvin, "Reuse of Wastewater Effluent as Cooling Tower Makeup Water," Univ. of Kentucky, Louisville KY, 1975, XP-001028672, pp. 501-514.

Maladinovic, N. et al., "Ammonia Removal from Saline Wastewater by Ion Exchange," Water, Air and Soil Pollution: Focus 4:169-177, 2004. Kluwer Academic Publishers, The Netherlands.

Maudru, J. E., "Ion Exchange in Beet Sugar Manufacture, Industrial and Engineering Chemistry" (1951), vol. 43:3, pp. 615-618.

Skoog et al Fundamentals of Analytical Chemistry Holt Rinehart & Winston New York, N.Y. 1963 pp. 173-174, 185-186.

* cited by examiner

METHODS OF FORMULATING WEIGHTING AGENTS USING PROCESSED WASTE WATERS

RELATED APPLICATIONS

This application is a division of application for U.S. patent, Ser. No. 11/643,477, filed Dec. 21, 2006 now U.S. Pat. No. 7,717,173.

The present invention relates to methods of forming drilling muds using processed waste water and products resulting from such processing as weighting agents.

BACKGROUND OF THE INVENTION

Water purification typically produces a first effluent of relatively "clean water" and a second effluent of "waste water" which include unwanted contaminants. The softening of hard water by the removal of calcium and magnesium is required for both industrial and household use. Known water softening processes proceed either by way of ion-exchange, membrane softening or precipitation. In the ion-exchange processes, the calcium and magnesium ions are exchanged for sodium and regeneration of the ion-exchange resin is achieved with a large excess of sodium chloride. This process creates a regeneration effluent that is a relatively concentrated aqueous solution of sodium, calcium and magnesium chlorides, which is normally discarded. Consequently, by this method, considerable amounts of sodium, calcium and magnesium salts in solution are lost.

Alternatively, it is possible to use weak acid resins which exchange hydrogen ions for calcium and magnesium, and to regenerate the spent resins with a mineral acid. While this method creates less waste water, it is more expensive and yields relatively acidic soft water which is corrosive.

Membrane softening concentrates the calcium, magnesium salts and salts of other divalent ions to produce waste waters which require costly disposal.

In the "lime-soda" precipitation process, lime is added to hard water to convert water-soluble calcium bicarbonate into water-insoluble calcium carbonate. This process results in waste water which is difficult to filter and requires cumbersome treatment.

Accordingly, it would be highly advantageous to provide improved methods of disposing of salty waste waters by methods which provide a beneficial use of the waters, which preserves the value of the salts.

SUMMARY OF THE INVENTION

Briefly, in accordance with the invention, I provide methods for economically and efficiently using waste waters produced by water purification and particularly waste waters produced from oil and gas wells and irrigation drainage.

The waste waters used in practicing the present invention are waters which are produced as a result of the purification of water, and particularly purified oil field production waters and irrigation drainage, which results in a first effluent of clean water and a second effluent of a waste water which must typically must be disposed of.

Typical water purification processes used to provide the second effluent waste water used in the present invention include osmosis, electro-dialysis, distillation, evaporation, ion exchange and lime softening. These processes create waste water having various levels of salt content. For the purposes of this invention, I define "waste water" as water containing about 0.15% or more by weight of the sodium, potassium, calcium, magnesium and/or iron salts of hydrochloric, sulfuric and/or carbonic acid or a combination thereof.

Practice of the present invention includes processing waste waters to produce products which are useable in the oil, gas and other drilling industries. More particularly, I have discovered that the water softening of waste waters produced from oil field operation produces two effluents, both of which can be used for oil, gas and other drilling applications. For practicing this embodiment of the invention, preferably the waste water is analyzed to confirm that it is free of hazardous materials, such as heavy metals. The waste water is then softened to produce a first "clean" effluent having increased sodium and potassium and a second regeneration effluent having increased calcium and magnesium.

Because oil field waste waters tend to have substantially high salt contents, even the "clean" effluent of softening will typically have a salt content of 0.15% by weight or more of salt. Accordingly, this clean water would ordinarily be too salty for potable use and would have to be discarded. However, in accordance with the invention, the first effluent from water softening is used: 1) as a weighting agent for drilling muds, 2) as an additive for cement for fabricating oil well casings, or 3) for injection into an oil well drill site formation for maintaining fluid pressure in a process called "water flooding".

DETAILED DESCRIPTION OF THE PREFERRED EMBODIMENTS

Figure 1:
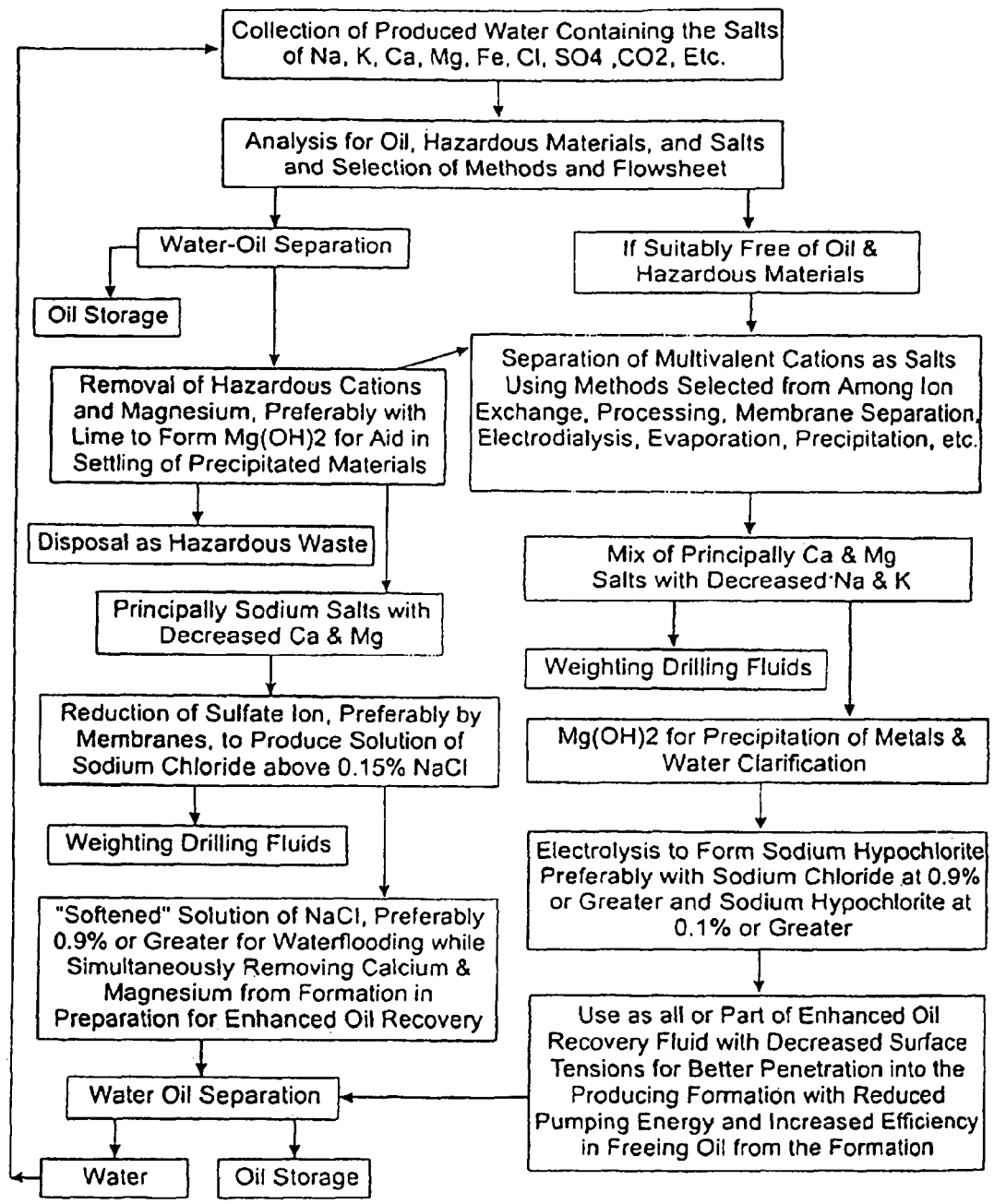
FIG. 1 is a flow sheet illustrating a preferred embodiment of the invention in which the products of water purification processes are used in the oil industry, for example, in Enhanced Oil Recovery methods.

Water softening is the removal of the "hardness" from the water which means predominantly removing or altering the calcium and magnesium ions from the water. Several methods for effecting water softening are known. The best known process for softening water is "ion-exchange". Ion-exchange entails the exchange of sodium, which is introduced into water, for calcium, magnesium, iron and other divalent mineral ions which are transferred out of the water and into a resin. When the resin approaches saturation with these hard ions, the resin is regenerated most often with solutions of sodium chloride leaving an effluent containing 3-25% sodium, calcium and magnesium salts which must be disposed of. The exact concentration of the effluent depends on the shop practice and, in particular, on the amount of rinse water included in the effluent, if any. Less often mineral acids like sulfuric acid or hydrochloric acid are used for water softening and these also produce waste effluents.

Membrane systems have recently become economically feasible. These systems, such as electro-dialysis and reverse osmosis also produce a salty effluent. For critical uses such as electronics, and particularly for use in the manufacture of computer chips, the first product of clean water may be further purified by dual bed or mixed bed ion-exchange treatment. This "polishing treatment" also produces an effluent containing the removed salts.

Each of these water purifying processes produce a clean water effluent and a waste water effluent which is expensive and difficult to dispose of For the purposes of this invention, "waste water" is defined as any water containing sufficient salts as to have no presently acceptable use due to costs or contamination levels. In general, waste water containing about 0.15% or more by weight of the sodium, potassium, calcium, magnesium and/or iron salts of hydrochloric, sulfuric and/or carbonic acids or combinations thereof and are typically considered as having no acceptable use and must be disposed of.

I have discovered that the products produced from water separation processing of waste waters have extensive application in the drilling industry. The water separation processes include, but are not limited to, ion exchange, membrane separation, electro-dialysis, evaporation, precipitation, known "salting out" processes, etc. The water separation processes are believed to have particular usefulness for oil and gas drilling, and accordingly, the following is described with particular emphasis to oil and gas drilling. However, the water separation processes of the present invention have broad application throughout various drilling industries including for use with wells drilled for water, carbon dioxide, nitrogen, natural gas, and oil.

Contaminants not ordinarily found in other waste waters are common in produced waters from oil and gas wells. Waste water from oil and gas wells most often contain metals in higher amounts than in waste waters from other sources. The high volume uses of waters such as for water flooding and the use of formulated solutions for enhanced oil and/or gas recovery have further restrictions on those cations like calcium and magnesium and the anions like bicarbonate, carbonate and sulfate, that can combine to form solids that hinder oil and/or gas recovery, particularly at temperatures of 300° F. and higher. The challenges for recycling are such that a report from Department of Petroleum Engineering, Texas A&M, states that of the 390 million gallons per day of excess produced water in the Permian Basin, only 1% is re-used and the remaining 350,000,000 gallons per day goes to disposal using re-injection wells. It would be highly beneficial if useful water and materials could be recovered from these waters.

Despite the above-described challenges, I have discovered that the products from purification of waste waters, including waste waters produced from oil and gas wells themselves, have extensive applications in the oil recovery industry. Where the oil or natural gas is produced from deeper formations, there is often enough heat available from the produced water, oil, and/or natural gas to materially improve the efficiency and the economics of recycling as compared with disposal as wastes. Additionally, the remote locations of many oil and gas resources adds premium value to local recycling by minimizing the energy use and time delays in transportation of materials to the drill site or production area and the costs associated with waste disposal, without damaging the environment. One example of the incentive for recycling is the use of centralized drilling areas and drilling platforms where first drilled wells may be producing waste water even while other wells are being drilled. In addition to the waste waters from the producing wells, there are waste waters from the purification of local brackish water or seawater for potable end uses and, except for hazardous wastes, much or even all of these saline waste waters may be recycled instead of being discharged to waste disposal.

Figure 2:
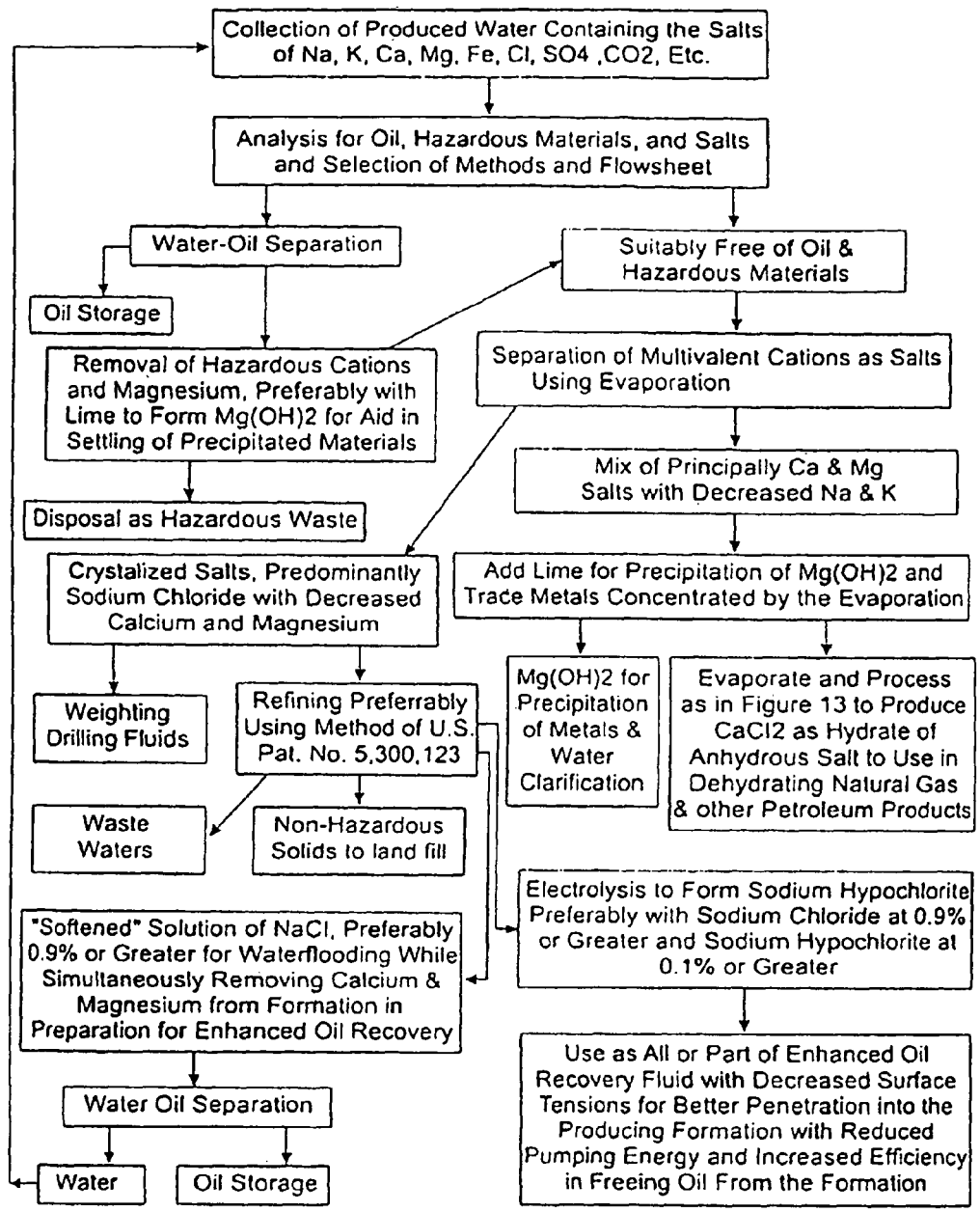
FIG. 2 is a flow sheet of another preferred embodiment of the invention using the products from water purification processes in oil field operations.

Described in general terms with reference to FIGS. 1-2, an embodiment of the present invention includes collecting the initial contaminated water having 0.15% by weight or more of salts of sodium, calcium, potassium, magnesium and iron salts of hydrochloric, sulfuric or carbonic acids or combinations thereof. The waste water is separation processed in which the amounts of salts in the effluents does not change, but the monovalent chloride salts are separated from multivalent salts. Preferably, after testing for hazardous materials, the waste water is separated to produce two effluents. Where the initial contaminated water has a relatively low sodium content, it is possible that this water may be used for potable use. Where the contaminated water has exceedingly high sodium or high overall salt content, which is typical of waste waters produced from oil recovery, the first effluent will typically have a salt content, such as 0.15% or much greater, which is not acceptable for use as drinking water. However, it has been discovered that this first effluent in its initial liquid state, or further concentrated to even a substantially solid salt state, can be used for various applications within the oil industry.

Produced water from oil and gas wells are typically high in the chloride salts of sodium, calcium, and magnesium, with lesser amounts of potassium and sulfate. The chloride salts have wide use in drilling oil and gas wells, while carbonate and sulfate anions can form troublesome precipitates with calcium and/or magnesium. After testing for and the removal of hazardous or otherwise detrimental materials, one or more separation processes are chosen to preferentially separate the sodium and potassium chlorides as brine or solids from calcium and magnesium chlorides or other multivalent salts. I have discovered that the mixed calcium and magnesium chlorides are suitable as weighting agents in drilling fluids ("muds") for wells. I have also found that calcium chloride, after removal of magnesium by precipitation using lime, is effective when used to accelerate the setting of cement. I have further discovered that the mixed sodium and potassium chlorides are suitable for use as weighting agents in drilling fluids. In addition, when there is a possibility for drilling through salt formations, the sodium/potassium chlorides may be used to saturate the water in the drilling fluid so as to avoid dissolving salt from the formation and thereby maintain control of the hole diameter.

The various uses within the oil industry for the first effluent produced from water separating of waste water are described above. However, I have discovered that waste water, including water produced from oil and gas wells, having a reduced sodium and potassium salts content and increased calcium and magnesium content, can also be used in the oil industry. Typically this second effluent containing predominantly calcium and magnesium chlorides will have a salty content of 1% or greater by weight. In addition, this salty brine can be further concentrated by solar evaporation.

As indicated in FIGS. 1-2, the second product can be either a liquid or substantially solid salt product if subjected to sufficient evaporation, and will have an increase in calcium and magnesium content compared to the untreated contaminated water. However, this second product containing calcium and/or magnesium is very useful for addition to drilling muds as a weighting agent. When the magnesium content is higher than desired, the magnesium can be precipitated as magnesium hydroxide, preferably by the addition of lime which forms additional calcium chloride of increased molecular weight as compared with magnesium chloride. The magnesium chloride is collected and used for treating waste waters to clarify them.

Presently, the operation of oil fields typically produces substantial unwanted waste water having 0.15% by weight or greater of the salts of sodium, calcium, potassium, magnesium and iron salts of hydrochloric, sulfuric or carbonic acids, or combinations thereof. Previously, this waste water would have to be disposed of at high cost. This high cost would be passed on to the consumer by way of increased oil prices. However, according to my invention, the waste waters can be water separated "on site" for use in the very same drilling fields. Often the oil field waste waters have salt contents far greater than 0.15% which results in a water separated effluent and a regeneration brine which previously could not be used. Indeed, it is anticipated that the water separating of waste waters collected from an oil field site will typically produce a first effluent having greater than 0.15% by weight of salts, and a higher sodium and potassium content, and a second regeneration brine typically having greater than 3.0% by weight of salts and an increased calcium and magnesium content. However, these products, as described above, still have usefulness within the oil industry as weighting agents.

These variations in waste water constituents require the use of various methods of water purification and use which, depending on local conditions, may be selected and practiced according to flow sheets illustrated in FIGS. 1-2. Testing by chemical and/or mechanical separation for oil, suspended solids, and metals as well as the more common salts, such as the sodium, potassium, calcium, magnesium or iron salts of hydrochloric, sulfuric or carbonic acids or mixtures thereof will indicate which processes are preferred for water purification, and their sequence of use, so as to ascertain the optimum point in the flow sheet for the removal of contaminants to levels required for the intended use.

Examples of some of the preferred methods of processing and using waste waters produced from oil fields are shown in FIG. 1, which illustrates a general example of the process of the present invention, adapted for analyzing local conditions of waste waters and for selecting the best practice of the present invention for that location.

A first step may include testing the waste waters for oil, hazardous materials and salt content. Depending upon the results of such analysis, contaminants may be removed as shown in one of the paths shown in FIG. 1. However, in the first stage separation of salts, where monovalent cations, predominantly sodium and potassium, are separated from salts of multivalent cations, predominantly calcium and magnesium, metals will report with the calcium and magnesium chlorides which are concentrated in a reduced volume of solution. This allows the removal of metals by precipitation along with magnesium by the addition of high pH hydroxides preferably lime, as either calcium oxide or hydroxide, and/or sodium hydroxide of potassium hydroxide. It is well known that the flocs of precipitated magnesium hydroxide aid in the settling of co-precipitated metal hydroxides and other particulates. The use of lime is preferable because the cost is lower than for sodium or potassium hydroxide and the use of lime produces a weight of calcium chloride greater than the reduction in weight of magnesium chloride. Having noted that a wide range of analyses and a wide range of recycled products can be produced, FIG. 1 is presented as a generalized flow sheet. Typically these processes are cost competitive with evaporation up to about 15,000 mg/l TDS but, again, local conditions are the determining factor.

FIG. 2 illustrates additional embodiments of the invention which are preferably practiced where the waste waters possess constituents different than those processed in FIG. 1. In FIG. 2, the brine from Permian Basin is used as an example. After evaporation in solar ponds to crystallize the monovalent sodium and potassium chlorides and reduce their content preferably to about 1% or less, the recovered sodium chloride here described as the first effluent, will total about 62,500 tons/year. The remaining brine, here described as the second effluent, will contain 5,160 tons/year of calcium-magnesium chlorides along with 500 tons/year of sodium chloride. This concentration is near the highest practical working concentration because of the influence of temperature on the solubility of calcium and magnesium chloride where even slight drops in temperature below 60° F. causes hydrates to form and settle in pumps, piping, valves and containers. Where transportation requires reduced weights, additional evaporation can be carried out to remove essentially all of the sodium chloride and to produce hydrates of calcium.

The crystallized sodium chloride is suitable for all of the uses of common solar salt, including weighting of drilling fluids, making salt saturated brine for drilling through salt formations and making salt saturated cement for securely sealing casing penetrating salt formations. This salt, low in calcium and magnesium, has particular use in sodium separation of water of up to 10,000 ppm to below 10 ppm hardness and suited for use in preflushing calcium and magnesium from a formation prior to the use of surfactants and/or polymers in Enhanced Oil recovery that requires sodium chloride.

I claim:

1. A method of utilizing contaminated waste water in oil or gas drilling operations, comprising the steps in combination of:
    collecting a contaminated water having 0.15% or more by weight of the salts of Na, Ca, Mg, K, Cl, $SO_4$ or $CO_3$ or combinations thereof;
    separation processing said contaminated water to produce:
        a first separated product having increased monovalent cation content and decreased multivalent cation content and
        a second separated product having decreased monovalent cation content and increased multivalent cation content; and
    adding one of said separated products as a weighting agent in formulating drilling fluids.

2. A method of utilizing contaminated waste water in oil or gas drilling operations as set forth in claim 1, wherein said weighting agent is provided with a low magnesium level.

3. A method of utilizing contaminated waste water in oil or gas drilling operations as set forth in claim 2, wherein lime is utilized to provide said weighting agent with a low magnesium level.

4. A method of utilizing contaminated waste water in oil or gas drilling operations as set forth in claim 1, wherein said contaminated water is collected from a first drilled well, and one of said separated products is added as a weighting agent in formulating drilling fluids at a second drilled well.

5. A method of utilizing contaminated waste water in oil or gas drilling operations as set forth in claim 4, wherein said weighting agent is provided with a low magnesium level.

6. A method of utilizing contaminated waste water in oil or gas drilling operations as set forth in claim 5, wherein lime is utilized to provide said weighting agent with a low magnesium level.

7. A method of utilizing contaminated waste water in oil or gas drilling operations, comprising the steps in combination of:
    collecting a contaminated water having 0.15% or more by weight of the salts of Na, Ca, Mg, K, Cl, $SO_4$ or $CO_3$ or combinations thereof;
    separation processing said contaminated water to produce:
        a first separated product having increased monovalent cation content and decreased multivalent cation content and a second separated product having decreased monovalent cation content and increased multivalent cation content;

adding said first separated product as a weighting agent in formulating a first drilling fluid; and adding said second separated product as a weighting agent in formulating a second drilling fluid.

* * * * *